I. STEIN.
RANGE METER.
APPLICATION FILED FEB. 25, 1920.
1,356,838.
Patented Oct. 26, 1920.
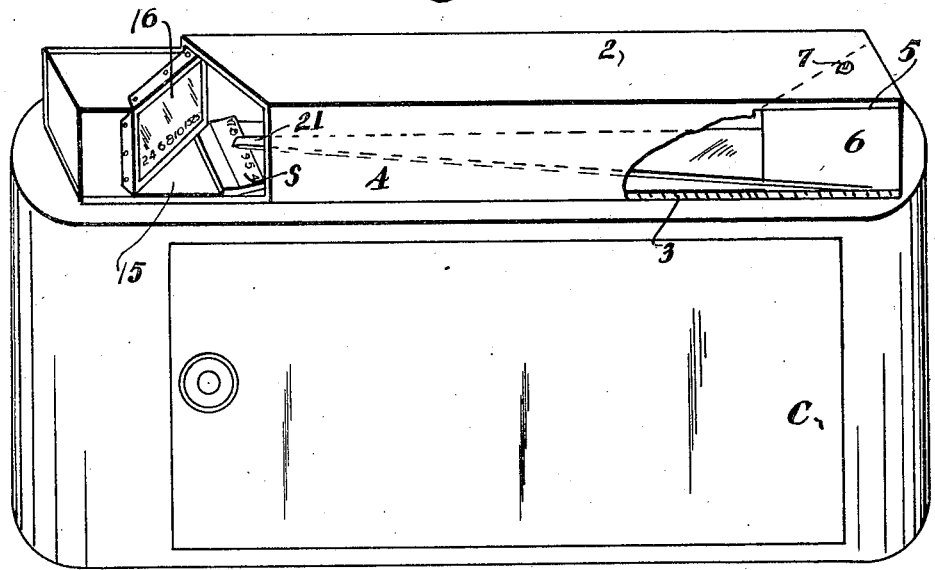
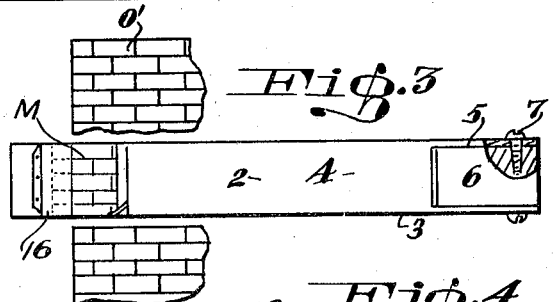
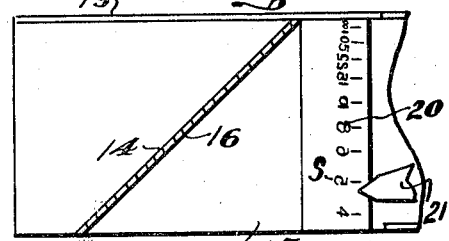
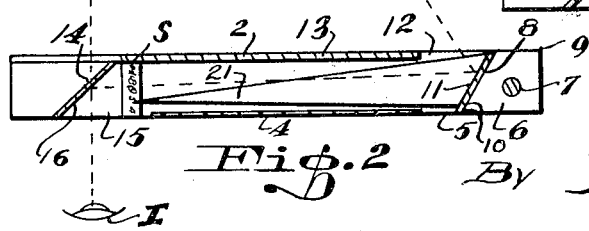
INVENTOR
Ivie Stein
By Hazard & Miller
ATT'YS

UNITED STATES PATENT OFFICE.

IVIE STEIN, OF SANTA ANA, CALIFORNIA.

RANGE-METER.

1,356,838. Specification of Letters Patent. Patented Oct. 26, 1920.

Application filed February 25, 1920. Serial No. 361,333.

*To all whom it may concern:*

Be it known that I, IVIE STEIN, a citizen of the United States, residing at Santa Ana, in the county of Orange and State of California, have invented new and useful Improvements in Range - Meters, of which the following is a specification.

This invention relates to means for finding a close approximation of the distance between an object to be photographed and a photographic camera, and has for its object to provide a device of this kind that is at once inexpensive, simple, compact, and that is operable without requirement of mental calculation by the user of the device. The invention consists of the construction, the combination, and in details and arrangements of the parts, an embodiment of which invention is illustrated in the accompanying drawings and described and claimed herein.

Figure 1 is a perspective of a camera on which the invention has been arranged to facilitate the finding of the distance of an object, to be photographed, from the camera.

Fig. 2 is a horizontal sectional view through the device.

Fig. 3 is a rear elevational view, partly broken away, and showing the mode of operation and the result produced.

Fig. 4 is a plan, horizontal, sectional view indicating on a larger scale the pointer and scale of the device.

In the embodiment of the invention as shown 2 represents a tubular casing of any suitable dimensions and made of any desired material but preferably is of such size that it may be readily packed in a carrying kit or comfortably carried in the pocket of wearing apparel. The tube is shown as oblong in plan and rectangular in cross section so that it presents a flat base or bottom 3 which enables the instrument to be readily arranged in a stable condition on the top for instance of a camera C. The rear side 4 of the camera is cut away as at 5 Fig. 1 and arranged between the top and bottom walls or members there is a block or swinging member 6 tiltable about a vertical axis member 7 in the form of opposed screws and the block is cut away at a diagonal plane 8 extending in a line from the front corner 9 obliquely toward the intermediate and inner corner 10 of the block. On this diagonal face there is arranged a mirror or reflecting surface 11 that is exposed through a cut away front window or opening 12 in the front wall 13. The opposite end of the casing 2 is provided with an oblique wall 14 inclining in about the same general direction as the wall or surface 8 and facing rearwardly through a window opening 15 in the casing. On this oblique wall 14 there is arranged or provided a reflecting face 16 with the result that an image is cast from the front-looking mirror 11 longitudinally through the tube or casing, the mirrored image being then reflected from the mirror 16 so that it is visible as from the point of view of the eye indicated I.

The device is operative on well-known principles of trigonometry in such manner that when the mirror 11 is turned about its axis 7 with respect to an object O in the field then when the image of the object O is reflected by the mirror 11 to the mirror 16 the approximate distance between the distance finding device and the object O can be deducted readily from a scale S arranged in the bottom adjacent the rear window 15. The scale is clearly shown on an enlarged ratio in Fig. 4 and on this scale there are arranged numerals 20, such, for instance, as 2—4—5—6—8—10—15—25 and so on if desired. These numbers forming the scale are spaced at a distance as is predetermined by the position of a pointer 21 that is secured to the swinging block 6 on which the mirror 11 is mounted. As is well-known, most cameras have a fixed focus beyond 100 feet but in taking pictures at less distances than 100 feet it is necessary to get the proper focal distance in order to secure a sharp picture and as the object decreases in distance from the camera the pointer 21 moves in increased ratio as between the lower distances in feet as clearly shown by the scale in Fig. 1. Therefore, when an object as O is close up to the camera with the meter finder thereon the pointer 21 will swing back toward back plate 4 of the casing, as shown in Fig. 4. As the distance of the object increases from the meter finder the pointer 21 swings toward the front wall 13 and the distance is clearly indicated by a number adjacent to which the pointer will rest when by holding the device, as shown in Fig. 2 with the object O, about centrally seen above the mirror 16 and at which time the image M is projected from the mirror 11 on to the mirror 16, and when the object O and the image M coincide vertically. It is then only necessary to read the position of the pointer over the scale S and thereafter focus the lens of the camera according to the indicated distance.

The scale S is clearly shown in Fig. 1 as so arranged and disposed that an image of its numerals will be thrown on to the reflector 16 when the numerals will appear in their normal and readily readable arrangement. As will be seen in Fig. 4, the numerals are arranged in inverted order on the face of the scale S to secure their normal exhibition in the mirror 16.

Various changes may be made without departing from the spirit of my invention, as claimed.

What is claimed is:

In a device for cameras for indicating the focal distance between an object to be photographed and the observer, the combination of a rectangular tube mounted on the camera at right angles to the focal center thereof, openings in each end of said tube on opposite sides, a reflector set in one of said openings and viewable from the rear in a line of vision between the observer and the object, a movable reflector set opposite the opening in the opposite end of said tube and adapted to be adjusted to cast a reflection of the object through the tube and on to the first named reflector, a pointer on the last named adjustable reflector movable over a coördinate scale adjacent the first named reflector from which the distance is readable according to the position of the pointer, the scale being arranged to be reflected in the first named reflector with the numerals thereon arranged to read in normal position by the reflection.

In testimony whereof I have signed my name to this specification.

IVIE STEIN.